Patented Aug. 25, 1925.

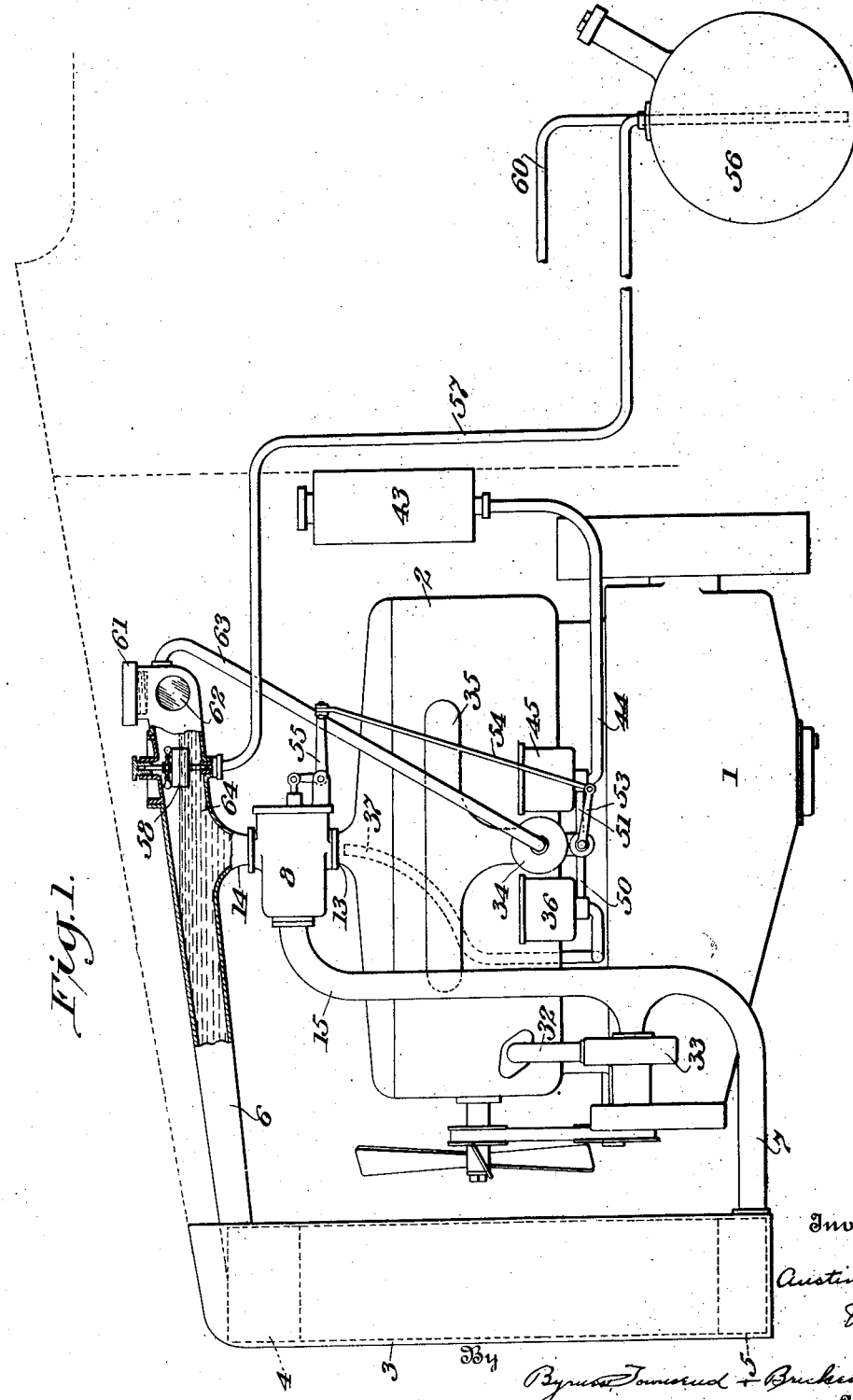

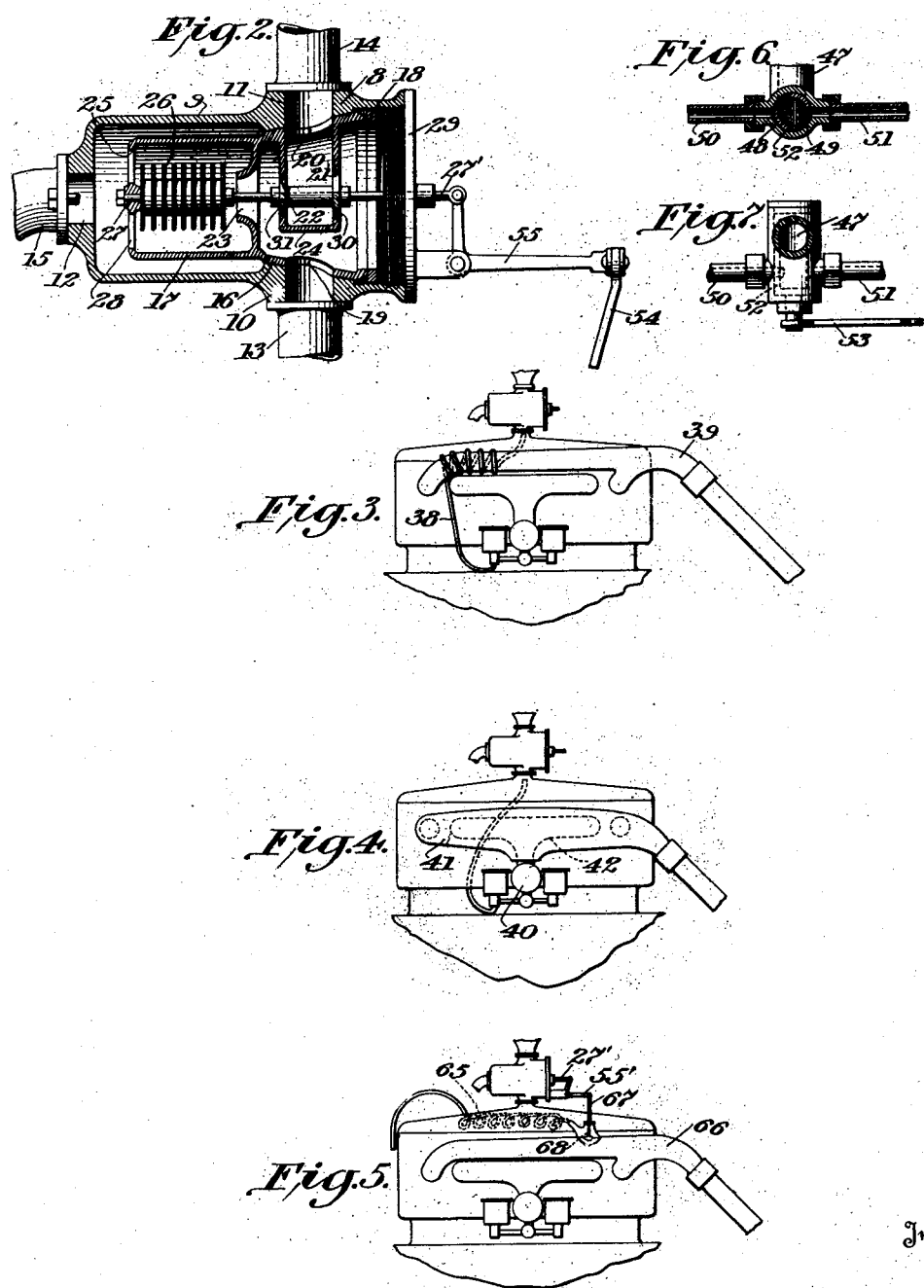

1,551,356

UNITED STATES PATENT OFFICE.

AUSTIN M. WOLF, OF PLAINFIELD, NEW JERSEY.

COMBINED FUEL AND COOLING SYSTEM FOR INTERNAL-COMBUSTION ENGINES.

Application filed April 1, 1918, Serial No. 226,019. Renewed May 27, 1925.

*To all whom it may concern:*

Be it known that I, AUSTIN M. WOLF, a citizen of the United States, residing at Plainfield, in the county of Union and State of New Jersey, have invented certain new and useful Improvements in Combined Fuel and Cooling Systems for Internal-Combustion Engines, of which the following is a specification.

The present invention relates to internal combustion engines and methods of operating the same, and more particularly to a method wherein heat is transferred from the cylinder walls to liquid fuel to cool the cylinder walls and heat the fuel, and the temperature of the fuel is maintained approximately constant, and to a combined fuel and cooling system which operates in accordance with such method.

It is the object of the invention to provide a fuel feed method and system in which the heat of combustion is advantageously utilized.

A more particular object is a method and system by which a maximum amount of the heat of combustion may be recovered and made available for the operation of the engine.

Another object is the provision of a system which combines with the advantage of saving a maximum amount of the sensible heat energy of the products of combustion the advantage of adaptability to all conditions arising in practice and the advantage of simplicity of structure and operation.

I am fully aware of the fact that attempts have been made in the past to utilize the sensible heat energy of the products of combustion and I know that efforts have been made to use fuel as a cooling medium to thereby make the heat of combustion again partly available for the operation of the engine.

My invention consists in the method of operation and the arrangement and combination of parts which will be more clearly described in the annexed specification and more particularly pointed out in the claims.

In the drawings which form a part of the specification:—

Fig. 1 is a schematic representation of a fuel feed system adapted to carry out my method and embodying the apparatus features of the invention;

Fig. 2 is a cross-sectional view of a thermostatic valve control forming a feature of the arrangement shown in Fig. 1;

Figs. 3, 4 and 5 are diagrammatic views of modifications which may be adopted to increase the efficiency of the arrangement shown in Fig. 1; and Figs. 6 and 7 are a vertical and horizontal section, respectively, disclosing the detail of the valve mechanism in advance of the carbureter.

In the drawings, 1 represents an internal combustion engine provided with a jacket 2, similar to the water jacket of any present type of engine. 3 represents a radiator which may be of the usual construction except that it has no filler cap. It contains the upper tank 4 and the lower tank 5. A pipe 6 connects the upper part of the jacket with the upper part of the radiator and a pipe 7 leads from the lower part of the radiator to the lower part of the jacket to form a complete circuit for the cooling medium, which is preferably a heavier fuel, such as kerosene for instance. In fact the invention is principally based on the idea of using a relatively dense fuel. Such fuels may be heated without danger to a relatively high temperature and are therefore peculiarly adapted to function as a cooling medium in the jacket. While at low temperature such heavy fuel is not at all suited for use in explosive engines, it may be used when its temperature is raised to a sufficient temperature. By using fuel of this kind as a cooling medium, the heat necessary for raising it to the necessary temperature is at once available. The structure to be presently described is intended to save as much as possible of the sensible heat energy given off to the cylinder walls by the products of combustion and to give up to the air only as much as is necessary to maintain the engine at a constant predetermined temperature.

Intermediate the jacket 2 and the pipe 6 is placed a thermostatically controlled valve mechanism 8 which is shown in detail in Fig. 2. A housing 9 of substantially cylindrical form has three ports 10, 11, and 12.

Port 10 is connected by a short connection 13 to the jacket 2, port 11 by a short connection 14 to pipe 6 and port 12 is connected to a pipe 15 to be subsequently described. The housing 9 has a tapered seat 16 to receive a removable member 17 having a correspondingly tapered face. The removable element 17 may be secured in position by a ring 18 or in any other suitable manner. In the tapered face of the member 17 are provided openings 19 and 20 to register with the ports 10 and 11 respectively and at one end of member 17 is an opening 25 which communicates with port 12. Intermediate the said openings are provided valve seats 21, 22 and an opening 23 also forming a valve seat. Seats 21 and 22 are formed in opposite sides of a box like structure 24 adjacent the opening 20 and seat 23 is substantially in alignment with the opening 25. Between openings 23 and 25 is disposed a heat responsive element 26. This element is mounted on the one side of a stub shaft 27 which has a bearing in a spider structure 28 extending across opening 25 and on the other side on a shaft 27' which has a bearing in a cap 29 screwed into the casing 9. This heat responsive element or thermostat, which may be of any preferred type, is so constructed that, when the fuel reaches a certain temperature, it begins to close the opening 23, one end piece of said element serving as a valve to close the opening 23, and so long as the fuel has a low temperature the opening 23 is wide open. The shaft 27' carries valves 30 and 31 so disposed thereon that they are seated on seats 21 and 22 when the opening 23 is wide open and are gradually opened as the opening 23 is gradually closed.

The pipe 15, which I call a by-pass, makes connection to the lower part of the jacket. In practice pipes 7 coming from the radiator and pipe 15 are joined and have a common connection 32 to the jacket. A pump 33 may be advantageously placed in this common connection to circulate the fuel through the jacket and the radiator or the by-pass 15. With the heavier fuels such as kerosene, positive circulation with a pump is particularly advantageous, especially with a fairly rapid speed of circulation, to prevent any of the lighter fractions of the liquid, if there should be any present, from separating from the heavier ones. The pump in this case would serve as a means for mechanically agitating the liquid and preventing segregation.

34 represents the carbureter which may be of the usual form connected to the intake manifold 35 and 36 the usual float bowl. A pipe 37 leads from the hottest portion of the fluid in the jacket, i. e. from a point near the thermostatic valve mechanism, to the float bowl 36. The carbureter 34 and float bowl are jacketed, the fluid medium entering this jacket and maintaining in this way a constant degree of heat similar to the temperature at which the thermostatic valve is set.

The pipe 37 may be jacketed or covered with a heat-insulating material or it may pass through the jacket as indicated in Fig. 1 and only the end passing out through the jacket is jacketed or insulated.

In Figs. 3 and 4 are shown several means and ways for heating the fluid on its way to the engine and thereby assuring efficiency of combustion. In Fig. 3 the fuel feed pipe 38 is shown as wound around the exhaust pipe 39. It is of course understood that the pipe 38 may be heat-insulated in any suitable way.

Fig. 4 shows means for heating the gases coming from the carbureter 40. Before they pass to the engine cylinders they are subjected to the heat of the exhaust gases. The exhaust manifold 41 is expanded to surround the intake manifold 42 and thereby give up to the gases some of the waste heat.

Since the fuel fed through pipe 37 is not suitable for purposes of efficient combustion in the engine until it has been heated to a suitable temperature, it is desirable to provide some auxiliary feed system for starting the engine when it is cold. While various means, such as a torch or electric heating means could be used to heat the fuel in the float chamber of the carbureter to the required temperature, I prefer to use an auxiliary supply sytsem. As indicated in Fig. 1 a small tank 43 which may be conveniently mounted on the dash board of an automobile may be filled with gasolene. The gasolene may be fed through a pipe 44 to a float chamber 45 and from there fed to the carbureter 34.

To automatically operate the auxiliary feed system and switch over to the main fuel feed system previously described when it is in proper condition for operation, I have provided the following means:

Intermediate the carbureter and the float chambers 36 and 45 I place a suitable valve 46 having a connection 47 to the carbureter (see Figs. 6 and 7), the valve casing having two intake ports and the valve sleeve 52 having two admission ports 48 and 49 so arranged that they may make connection with either the float chamber 36 through pipe 50 or chamber 45 through pipe 51 depending upon the position of the valve sleeve. The valve sleeve 52 is connected through a lever system comprising lever 53, connecting rod 54 and bell crank 55 to the end of shaft 27'. While the engine is cold and the thermostat contracted, the port leading to the pipe 50 is closed and the port leading to the pipe 51 is open. As the thermostat expands and rod 27' is shifted to the right in Figs. 1 and 2, the motion is transmitted through the lever system to the valve sleeve 52 to gradually bring the sleeve port 48 in communication with the port leading to the pipe 50 and to close the port to the pipe 51. By suitably choosing the ports 48 and 49 and their relative position, the shifting over from one feed system to the other may be suitably determined according to the particular temperature desired. It is understood that mechanism may be employed for making the change from one system to the other abrupt instead of gradual, as by the use of cams and spring controlled valve gates or other contrivances well known in the arts. What is shown is merely intended as an illustration of a general principle.

The main supply tank 56, which may have any desired location, supplies fuel through pipe 57 to the float mechanism 58 located in an extension 64 of the pipe 6. This float is similar in construction to any carbureter float and maintains a constant level of the fuel. In order to raise the fuel to the level required, pressure from the exhaust or from a small air pump is supplied through pipe 60. Any desirable form of fuel elevating mechanism may be used, for instance, the Stewart-Warner vacuum system. Alongside of the float is provided the filler cap 61 and a glass window 62 may be used to permit of a visual inspection of the level. The cap 61 when screwed down tight forms an air-tight closure. A vent pipe 63 may be connected to the extension 64 at a point which is above the level of the liquid in the extension. This vent pipe leads to and extends into the mixing chamber of the carbureter and therefore any gas which is given off by the fuel used as a cooling medium will be supplied directly to the carbureter.

In Fig. 5 is shown an arrangement by which the fuel in the jacket may be more rapidly brought up to the proper temperature for consumption in the engine. A heating coil 65 may be placed in the upper part of the jacket and have one end connected to the exhaust pipe 66 and the other end to the atmosphere. The admission of gas from the exhaust pipe to this coil may be controlled by a valve 68 connected through rod 67, the bell crank 55 and the rod 27' to the thermostat similar to the arrangement for controlling the valve 46. The valve 68 would then close as soon as the temperature of the fuel has reached predetermined value.

A feature of particular advantage is the removability of the member 17 from the housing 9. It is thus possible to quickly exchange the thermostatic element where this is made necessary by the use of a different fuel.

The operation is as follows:

When the engine is first used and the jackets are empty, the heavy distillate is poured through the filler cap 61 until the system is filled, after which there is no further need of using the filler cap. The tank 56 is filled and thereafter is the only place into which fuel is poured.

The engine is started in the usual way and the auxiliary tank supplies starting fuel through the pipe 44 in the usual way. In the beginning the main fuel circulates through the jacket and the by-pass 15, the valves 30 and 31 being closed and the opening 23 being wide open. As the temperature of the fuel in the jacket rises, the thermostat begins to expand when a certain temperature is reached and to gradually close the opening 23, at the same time opening the valves 30 and 31. Part of the fuel will then pass through the by-pass and part through the radiator, the proportionate amount passing through the radiator increasing as the temperature of the fuel increases above a certain degree, until finally if the temperature rises sufficiently, the by-pass is closed and all the fuel circulates through the radiator. So also, if the rate of heat dissipation by the radiator should exceed the rate of heat absorption by the fuel liquid in the jacket, causing a drop in the temperature of the liquid, the thermostat will operate to reduce the amount of liquid flowing to the radiator. The amount of fuel liquid passing through the radiator will thus be varied according to the temperature of the liquid, and the temperature of the liquid will be maintained approximately constant. Concurrently with the operation of the valve mechanism 30, 31 and 23 the valve mechanism 46 is operated to switch over from the auxiliary feed system to the main feed system.

A particular utility of the system described is its adaptability to all conditions. In winter and summer, the system works equally well. Freezing and jacket scale are prevented.

Another advantage of the system is the use of a smaller radiator. Due to the high working temperature of the engine there is a greater relative temperature difference between the cooling medium and the air and therefore the rate of heat exchange through the radiator is considerably greater than in the usual types of systems.

By the use of the by-pass and the thermostat control thereof the fuel is heated up in a very short time, since there is practically no loss of heat when the circulation through the radiator is cut off. The by-pass lies close to the warm engine and may be heat-insulated to reduce the loss of heat through it to a minimum.

In the foregoing I have not attempted to point out the various changes and modifications of which my system is susceptible, but have limited myself to the description of the principal features.

It will be noted that the devices described permit the heating of low grade fuel to proper temperature and maintaining such temperature absolutely constant, which is essential for the successful carbureting of such fuel, the temperature maintained being independent of weather conditions and of the variations in the temperature of the exhaust gases, etc. My thermostatic control of the fuel temperature also permits an increase, at all times, of the thermal efficiency of the engine, in comparison with the various water-cooled engines. In case kerosene, having an initial distillation temperature of 390° F., is used as the fuel, the thermostat may be set to maintain the kerosene in the engine jacket at a constant temperature of about 350° F. Thereby, no fuel vapor being lost by ebullition in the system described, a high engine temperature is maintained, and accordingly a higher thermal efficiency than in the case of a water-cooled engine, which cannot safely be operated much above 180° F. in an automobile, or above 212° F. if a condenser is provided. It is obvious that even higher temperatures may be employed if lower fuels than kerosene, such, for example, as coal oil, are used, the only limit being set by the ability of the lubricating oil used to withstand high temperatures, this limit being at present about 500° F.

The invention is applicable to all types of internal combustion engines; for instance for moter vehicle, tractor, aviation, stationary and marine work. In the latter case, the radiator would be replaced by a submerged coil or pipe.

I claim:

1. The method of operating an internal combustion engine, which comprises transferring heat from the cylinder walls of the engine to a body of liquid fuel to cool the cylinder walls and heat the fuel, discharging heat from said body of fuel to limit its rise in temperature, controlling the rate of such heat discharge according to the temperature of the fuel liquid to maintain the temperature of the fuel approximately constant, and supplying fuel from said heated body of fuel liquid to the fuel feeding means of the engine.

2. The method of operating an internal combustion engine, which comprises causing a body of liquid fuel to circulate through a cooling passage of the engine to cool the cylinder walls and to heat the fuel, discharging heat from such fuel to limit its rise in temperature, varying the rate of such heat discharge according to the temperature of the fuel to maintain the temperature of the fuel liquid approximately constant, and supplying the fuel from said heated body of fuel liquid to the fuel feeding means of the engine.

3. The method of operating an internal combustion engine, which comprises causing the fuel to pass through a passage of the engine to heat the fuel, discharging heat from the fuel to limit its rise in temperature, controlling the rate of such heat discharge according to the temperature of the fuel to maintain the fuel at an approximately constant predetermined temperature, and supplying such heated fuel to the fuel feeding means of the engine.

4. The method of operating an internal combustion engine, which comprises transferring heat from the cylinder walls of the engine to a body of liquid fuel to cool the cylinder walls and heat the fuel, causing said fuel liquid to circulate through a heat-dissipating means, varying the flow of the fuel through the heat-dissipating means according to the temperature of the fuel to maintain the temperature of the fuel approximately constant, supplying fuel from said heated body of fuel liquid to the fuel feeding means of the engine, and supplying fuel to maintain the amount of fuel in said body of fuel liquid approximately constant.

5. The method of operating an internal combustion engine, which comprises transferring heat from the cylinder walls of the engine to a body of liquid fuel to cool the cylinder walls and heat the fuel, supplying fuel from said body of fuel to the fuel feeding means of the engine, supplying fuel to maintain the amount of fuel in said body of fuel approximately constant, discharging heat from said body of fuel to limit the increase in temperature of the fuel, varying the rate of discharge of heat from the fuel according to the temperature of the fuel to maintain the temperature of the fuel approximately constant, and minimizing the discharge of heat from the fuel when the temperature of the fuel is below approximately the desired operating temperature.

6. A fuel supply and cooling system for internal combustion engines, comprising an engine jacket adapted to contain a fuel liquid, a short connection between separated points of the jacket for the circulation of the liquid, a radiator and conduits for connecting the radiator to the jacket, automatic means for controlling the flow of the liquid through said connection and the radiator to maintain the temperature of the liquid approximately constant, and a connection for supplying the heated liquid to the fuel feed mchanism of the engine.

7. A fuel supply and cooling system for internal combustion enigens, comprising an engine jacket adapted to contain a fuel liquid, a short connection between separated points of the jacket for the circulation of the liquid, a radiator and conduits for connecting the radiator to the jacket, heat responsive means for automatically controlling the flow of the liquid through said connection and the radiator to maintain the temperature of the liquid approximately constant, and a connection for supplying the heated liquid to the fuel feed mechanism of the engine.

8. A fuel supply and cooling system for internal combustion engines, comprising an engine jacket adapted to contain a fuel liquid, means providing with said jacket a circulation system, said means comprising a short connection between separated points of the jacket and a radiator and conduits for connecting the radiator to the jacket, a thermostat exposed to the liquid, valve mechanism for controlling the flow of the liquid through said connection and the radiator, said thermostat and valve mechanism being so related that the liquid is caused to pass through said connection while it is relatively cold and to pass in increasing quantity through the radiator as the temperature of the liquid increases above a predetermined value, and a connection for supplying heated liquid from said circulation system to the fuel feeding means of the engine.

9. A fuel supply and cooling system for internal combustion engines, comprising an engine jacket adapted to contain a fuel liquid, means providing with said jacket a circulation system, said means comprising a short connection between separated points of the jacket and a radiator and conduits for connecting the radiator to the jacket, a thermostat exposed to the liquid, valve mechanism for controlling the flow of the liquid through said connection and the radiator, said thermostat and valve mechanism being so related that the liquid is caused to pass through said connection while it is relatively cold and when the temperature of the liquid has reached a predetermined value to pass through the radiator in quantity increasing as the temperature of the liquid increases above such predetermined value, a fuel feed mechanism for the engine, a supply conduit for feeding the heated liquid to the said feed mechanism, an auxiliary fuel supply conduit connected to said feed mechanism, and means controlled by said thermostat for controlling the flow of liquid through said supply conduits.

10. A fuel supply and cooling system for internal combustion engines, comprising an engine jacket adapted to contain a fuel liquid, means providing with said jacket a circulation system, said means comprising a short connection between separated points of the jacket and a radiator and conduits for connecting the radiator to the jacket, a thermostat exposed to the liquid, valve mechanism for controlling the flow of the liquid through said connection and the radiator, said thermostat and valve mechanism being so related that the liquid is caused to pass through said connection while it is relatively cold and when the temperature of the liquid has reached a predetermined value to pass through the radiator in quantity increasing as the temperature of the liquid increases above such predetermined value, a fuel feed mechanism for the engine, a supply conduit for feeding liquid from the circulating system to the said feed mechanism, an auxiliary fuel supply conduit connected to said feed mechanism, valve mechanism for controlling the flow of liquid through the said supply conduits, and lever mechanism connected to the thermostat to open the valve controlling the auxiliary fuel supply while closing the valve controlling the flow of liquid from the circulation system when the liquid in the jacket is relatively cold and to open the latter while closing the former when the liquid in the jacket has reached a temperature of predetermined value.

11. A fuel supply and cooling system for internal combustion engines, comprising an engine jacket adapted to contain a fuel liquid, means providing with said jacket a circulation system, said means comprising a short connection between separated points of the jacket and a radiator and conduits for connecting the radiator to the jacket, a thermostat exposed to the liquid, valve mechanism for controlling the flow of the liquid through said connection and the radiator, said thermostat and valve mechanism being so related that the liquid is caused to pass through said connection while it is relatively cold and when the temperature of the liquid has reached a predetermined value to pass through the radiator in quantity increasing as the temperature of the liquid increases above such predetermined value, a carburetor, a supply conduit for feeding liquid from the jacket to the carburetor, an auxiliary fuel supply conduit connected to the carburetor, and means connected to the said thermostat for controlling the flow of liquid through said supply conduits.

12. A thermostatically controlled valve device comprising a housing having a plurality of openings, a removable inner member comprising a casing having ports corresponding to said openings and having a plurality of valves to control the flow of a fluid through said ports and openings, and a thermostat on said removable member for actuating the said valves.

13. In a combined fuel-supply and cooling system for internal combustion engines, a radiator and pipes connecting the engine jacket therewith, said radiator, pipes and jacket being adapted to contain a fuel liquid, a thermostat-chamber having fluid connection with the upper part of the radiator and with the upper part of the jacket and a separate fluid connection with the lower part of the jacket constituting a by-pass, a carbureter, a conduit for conveying fuel liquid from said chamber to said carbureter, means including a thermostatic valve device in said chamber for controlling and inversely varying the flow of the liquid through the radiator and through said by-pass according to the temperature of the liquid, a starting-fuel supply chamber connected by a passage with said carbureter, and means controlled by the operation of said thermostatic valve device for controlling said fuel-conveying conduit and said starting-fuel passage to supply the starting fuel when the fuel in the jacket is relatively cold.

14. A fuel supply system for internal combustion engines, comprising means for utilizing some of the sensible heat energy of the products of combustion to heat the fuel, heat dissipating means for dissipating heat from the fuel, and means responsive to variations in temperature of the fuel for controlling the dissipation of heat from the fuel to maintain the fuel at a substantially constant predetermined temperature during the operation of the engine independently of variation in the supply of heat to the fuel.

15. A fuel supply system for internal combustion engines, comprising means for utilizing some of the sensible heat energy of the products of combustion to heat liquid fuel, heat dissipating means, and heat responsive means exposed to the fuel liquid and operative to cause the heat dissipating means to act on the fuel to maintain it at a substantially constant predetermined temperature during the operation of the engine independently of variation in the supply of heat to the fuel.

16. In a fuel-supply and cooling system for internal combustion engines, the combination with a cooling passage of the engine cylinder and heat dissipating means and connecting passages forming a circulation system for the circulation of a body of liquid fuel, of means controlled according to the temperature of the fuel liquid in the circulating system for minimizing the dissipation of heat from the liquid when the temperature of the liquid is comparatively low and for increasing the dissipation of heat from the liquid by said heat dissipating means as the temperature of the liquid increases above a predetermined temperature, a connection for supplying heated fuel from said body of liquid fuel to the fuel feeding means of the engine, and means for supplying fuel to maintain the amount of fuel in said body of liquid fuel approximately constant.

17. In a fuel-supply and cooling system for internal combustion engines, the combination with a cooling passage of the engine cylinder and a radiator and connecting passages forming a circulation system for the circulation of a body of liquid fuel, of means operative to vary the flow of the liquid through the radiator according to variations in the temperature of the liquid in the circulation system to maintain the temperature of the liquid approximately constant, a connection for supplying heated fuel from said body of liquid fuel to the fuel feeding means of the engine, and means for supplying fuel to maintain the amount of fuel in said body of liquid fuel approximately constant.

18. A fuel-supply and cooling system for internal combustion engines, comprising means for causing a body of liquid fuel to circulate through a cooling passage of the engine cylinder to cool the cylinder walls by absorbing heat therefrom and to heat the fuel liquid, a connection for supplying heated fuel from said body of liquid fuel to the fuel feeding means of the engine, means for discharging heat from said body of fuel liquid, and means responsive to variations in temperature of the fuel liquid for controlling the operation of said heat discharging means to maintain the fuel liquid at a substantially constant predetermined temperature during the operation of the engine.

19. A fuel supply system for internal combustion engines comprising a receptacle for containing a fuel liquid, means for utilizing some of the sensible heat energy of the products of combustion to heat the said liquid, means for minimizing dissipation of heat to the outside while the temperature of the liquid is relatively low, a heat dissipating device, and means responsive to variations in temperature of the liquid for causing the liquid to be acted on by the heat dissipating device when the liquid has reached a relatively high temperature and to maintain the liquid at a substantially constant predetermined temperature during the operation of the engine.

20. A cooling system for internal combustion engines, comprising an engine jacket, a radiator, a conduit leading from the radiator to the jacket, a conduit leading from the jacket to the radiator the highest point of which is above the level of the top of said radiator, and a filling inlet at a high point of the last said conduit, and a vent pipe for the passage of fuel vapor to the fuel feeding means of the engine leading from a high point of the last said conduit above the liquid level.

21. In a fuel supply and cooling system for internal combustion engines, the combination with an engine jacket and a radiator and connecting passages forming a circulation system for the circulation of a body of liquid fuel, of means for varying the circulation of the liquid through the radiator, a carbureter, a connection for supplying heated liquid from said body of liquid fuel to the carbureter, and a vent pipe leading to said carbureter from a point above the liquid level in said circulation system.

22. In a fuel-supply and cooling system for internal combustion engines, the combination with a cooling passage of the engine cylinder and heat-dissipating means and connecting passages forming a circulation system for the circulation of a body of liquid fuel, and including a vapor space above the normal liquid level, of a connection for supplying heated fuel from said body of liquid fuel to the fuel feeding means of the engine, a connection for supplying fuel vapor from said vapor space to the fuel feeding means of the engine, and means for supplying fuel to maintain the amount of fuel in said body of fuel approximately constant.

23. In a fuel-supply and cooling system for internal combustion engines, the combination with an engine jacket and a radiator and connecting passages forming a circulation system for the circulation of a body of liquid fuel, of means controlled according to the temperature of the liquid for varying the circulation of the liquid through the radiator to maintain the liquid at a substantially constant predetermined temperature, and means for supplying heated liquid from said body of liquid fuel to the fuel feeding means of the engine.

24. In a fuel supply and cooling system for internal combustion engines, the combination with an engine jacket and heat dissipating means and connecting passages forming a circulation system for the circulation of a body of liquid fuel, of means controlled according to the temperature of the liquid for varying the circulation of the liquid through the heat dissipating means to maintain the liquid at a substantially constant predetermined temperature, means for preventing segregation of lighter fractions of said liquid from heavier fractions thereof, and means for supplying heated liquid from said body of liquid fuel to the fuel feeding means of the engine.

25. In a fuel supply and cooling system for internal combustion engines, the combination with an engine jacket and a radiator and connecting passages forming a circulation system for the circulation of a body of liquid fuel, of means for varying the circulation of the liquid through the radiator, means for supplying heated liquid from said body of liquid fuel to the fuel feeding means of the engine, and means for further heating said liquid before it reaches said fuel feeding means.

26. A fuel supply system, comprising means for heating the fuel, heat dissipating means for dissipating heat from the fuel, and means responsive to variations in temperature of the fuel for controlling the dissipation of heat from the fuel to maintain the fuel at a substantially constant predetermined temperature independently of variations in the supply of heat to the fuel.

27. The method of operating an internal combustion engine, which comprises utilizing some of the heat energy of the products of combustion to heat the fuel, discharging heat from the heated fuel to limit the increase in temperature of the fuel, varying the rate of discharge of heat from the fuel according to the temperature of the fuel to maintain the temperature of the fuel approximately constant, and minimizing the discharge of heat from the fuel when the temperature of the fuel is below approximately the desired operating temperature.

28. The method of burning liquid fuel, which comprises utilizing heat energy of the products of combustion to heat the fuel liquid, discharging heat from the fuel liquid to limit its rise in temperature, varying the rate of such heat discharge according to the temperature of the fuel liquid to maintain the temperature of the fuel liquid approximately constant, and burning such heated fuel.

29. The method of burning fuel, which comprises utilizing heat energy of the products of combustion to heat the fuel, discharging heat from the fuel to limit its rise in temperature, varying the rate of such heat discharge according to the temperature of the fuel to maintain the temperature of the fuel approximately constant, and burning such heated fuel.

30. The method of burning fuel, which comprises heating the fuel, discharging heat from the fuel to limit its rise in temperature, varying the rate of such heat discharge according to the temperature of the fuel to maintain the temperature of the fuel approximately constant independently of variations in the supply of heat to the fuel, and burning such heated fuel.

In testimony whereof, I affix my signature.

AUSTIN M. WOLF.